United States Patent [19]

Sadler

[11] Patent Number: 4,718,404
[45] Date of Patent: Jan. 12, 1988

[54] SOLAR COLLECTOR APPARATUS AND METHOD

[76] Inventor: Charlton Sadler, P.O. Box 446, Brooksville, Fla. 33512

[21] Appl. No.: 844,117

[22] Filed: Mar. 26, 1986

[51] Int. Cl.$^4$ .............................................. F24J 2/24
[52] U.S. Cl. ..................................... 126/448; 126/450
[58] Field of Search ................. 126/448, 450, DIG. 2; 165/173

[56] References Cited

U.S. PATENT DOCUMENTS

| | | | |
|---|---|---|---|
| 4,062,351 | 12/1977 | Hastwell | 126/432 X |
| 4,217,887 | 8/1980 | Hoffman et al. | 126/448 |
| 4,222,373 | 9/1980 | Davis | 126/448 |
| 4,271,103 | 6/1981 | McAlister | 264/1 |
| 4,291,683 | 9/1981 | Bayles | 126/448 |
| 4,321,911 | 3/1982 | Offutt | 126/448 |
| 4,474,173 | 10/1984 | Ford | 126/450 |

FOREIGN PATENT DOCUMENTS 2462668 3/1981 France .............................. 126/450

OTHER PUBLICATIONS

J. P. Wisnewski, "All-Glass Solar Collector", from *NASA Tech. Briefs*, Fall 1979, vol. 4, No. 3, p. 359.

*Primary Examiner*—Samuel Scott
*Assistant Examiner*—Allen J. Flanigan
*Attorney, Agent, or Firm*—Dominik, Stein, Saccocio & Reese

[57] ABSTRACT

A solar collector composed of extruded ceramic collector plates joined together by means of rubber connectors and interconnecting manifolds to form a collector having the desired configuration and collector area. Means are also disclosed to protect the collector from contamination due to debris, dirt, etc.

10 Claims, 8 Drawing Figures

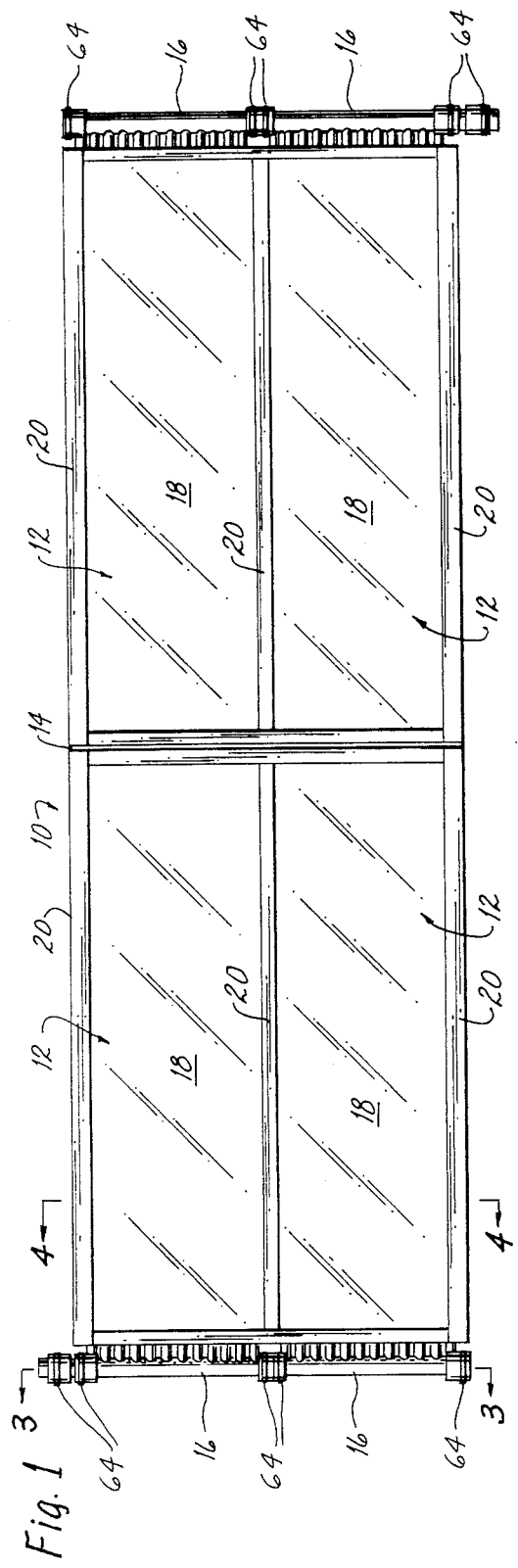
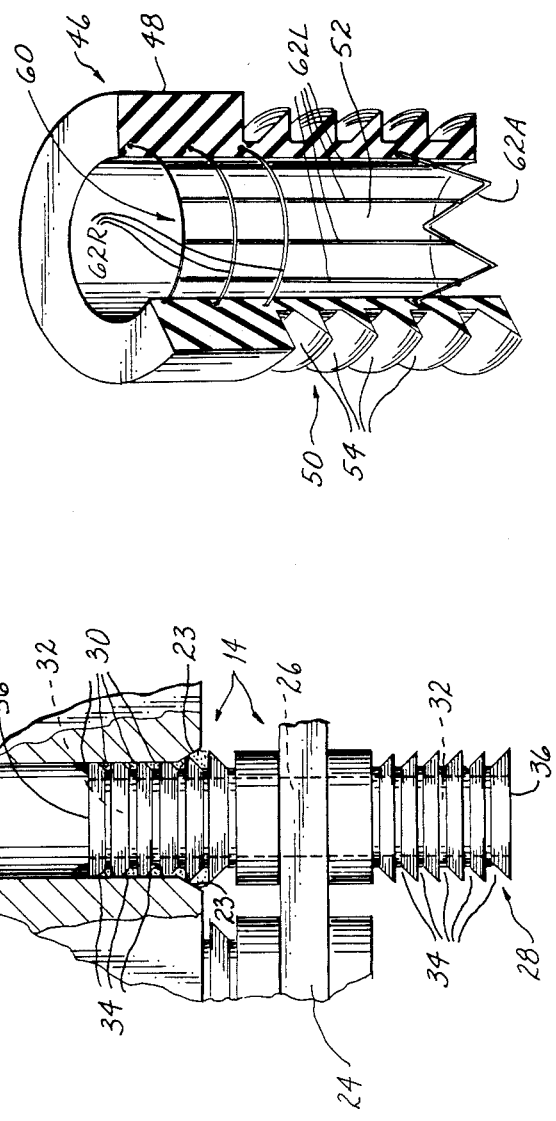

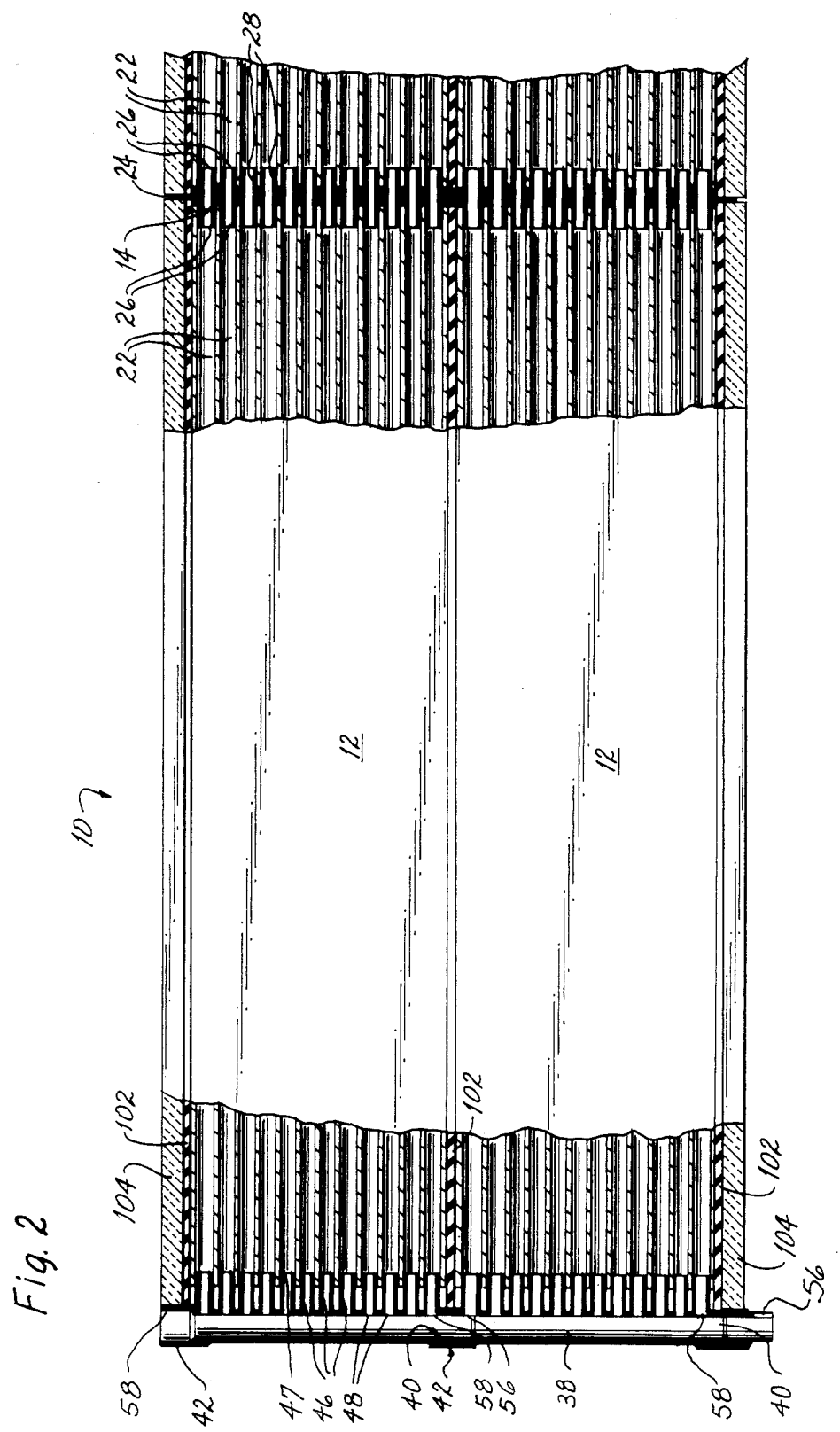

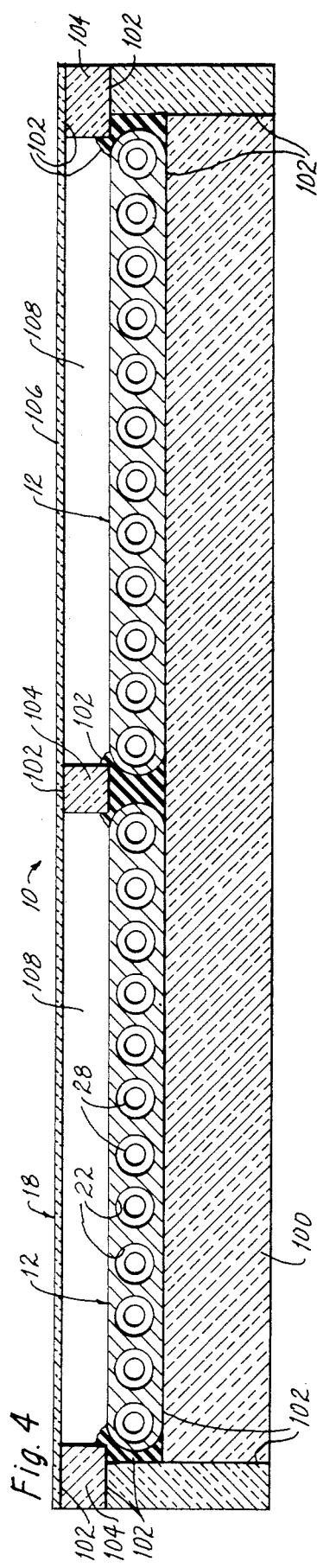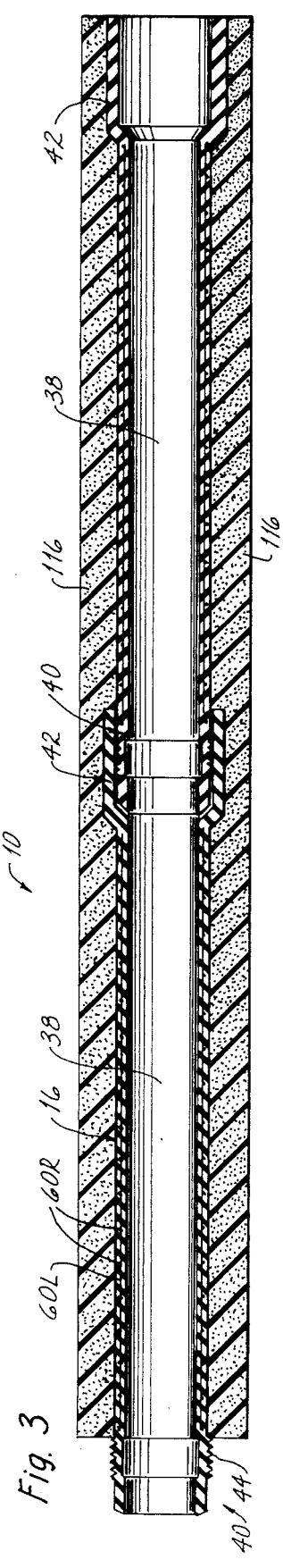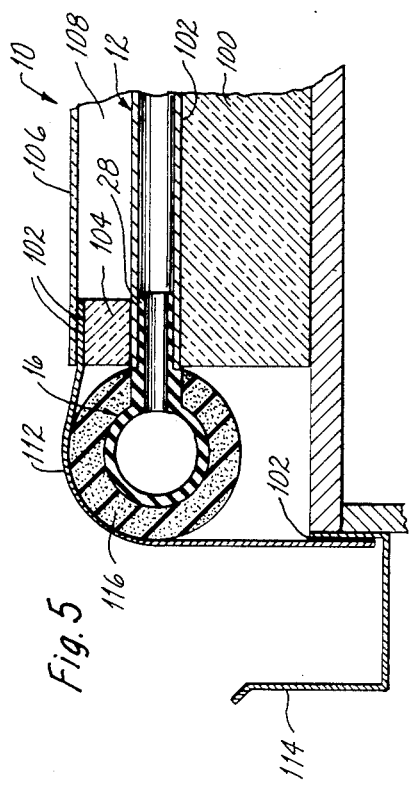

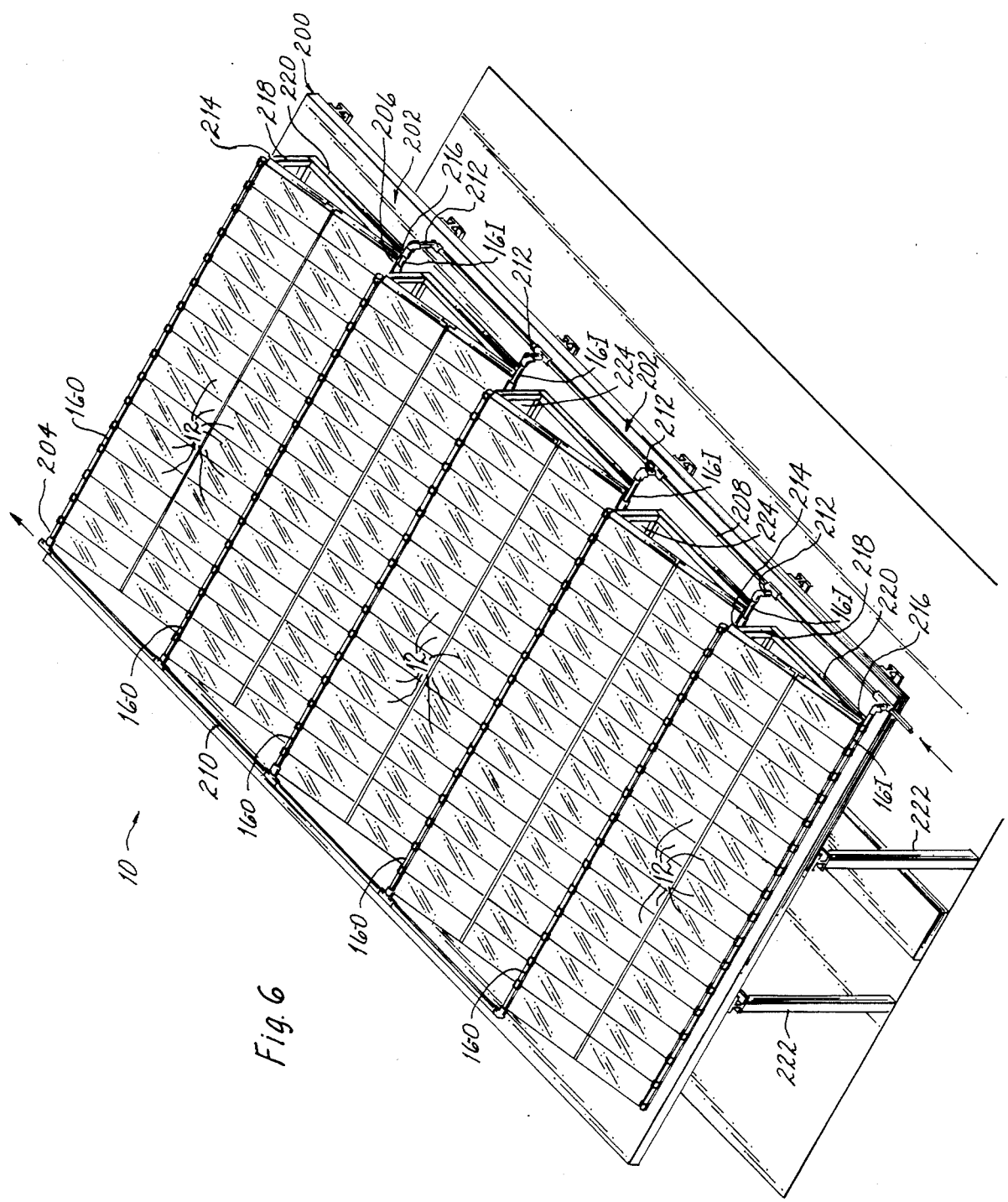

SOLAR COLLECTOR APPARATUS AND METHOD

BACKGROUND OF THE INVENTION

1. Field of the Invention

This invention relates generally to solar collectors and, more particularly, to an apparatus and method for forming a solar collector by an extrusion process utilizing ceramic or similar materials. This invention also relates to manifolds for fluidly interconnecting a series of extruded solar collectors. Finally, this invention still further relates to building roof construction composed of a plurality of extruded solar collectors positioned side by side and interconnected by a unique manifold system.

2. Description of the Background Art

Presently, the substantial increase in the cost of fuel has encouraged investigation into alternative forms of energy to meet the needs of coming generations. Significant emphasis has been placed on the investigation of nuclear power, wind power, wave power and solar power. Among the most promising of these alternatives is the collection of solar energy. Solar energy has the advantage of being environmentally safe and producing no waste products. In addition, the source of power is essentially limited only by the number of collectors constructed. Solar collectors are also capable of operation at almost any location without concern for environmental impact on the location.

Experience has shown that the most economical solar collectors comprise liquid heating solar collectors which are capable on being mounted of the roof of commercial and residential buildings. These liquid heating solar collectors typically comprise aluminum, copper or other metallic solar collectors which are relatively costly to manufacture. While less expensive plastic extruded solar collectors have been developed, the relatively high cost of both of these types of collectors has discouraged the widespread use of the units on building installations. In addition, such state-of-the-art solar collectors typically cannot withstand the exposure of sunlight and other environmental factors and, therefore, degrade with time.

In my prior application, Ser. No. 921,053, now U.S. Pat. No. 4,170,983, the disclosure of which is hereby incorporated by reference herein, I invented a unique method and apparatus for manufacturing solar collectors from a liquid ceramic material. The solar collectors were formed by positioning a first and a second mold element of a liquid absorbing material relative to one another to form a mold cavity. The mold cavity defined the outer configuration of the solar collector. The mold cavity was then filled with a curable material, such as liquid ceramic material or any other material which cures upon the loss of liquid. The mold cavity was drained when the curable material was cured adjacent to the first and second mold elements, thereby removing the internal uncured material to define the internal configuration of the solar collector. The solar collector was then fired to provide a solar collector of a ceramic material having input and output manifolds with a plurality of fluid connection paths extending therebetween.

The use of ceramic as a component material for a solar collector can be readily appreciated by those skilled in the art. History has established that ceramic material is durable for use as a roof tile and like. Accordingly, my prior invention provided a low-cost system which is durable, thereby resulting in a feasible solar collector for commercial and domestic installations. The raw material costs and manufacturing costs are extremely low in comparison to conventional aluminum, copper and other metallic solar collectors now known in the art. Further, in comparison to plastic solar collectors, ceramic solar collectors are impervious to the adverse effects of the environment, including ultra-violet radiation from the sun.

Possibly the only disadvantage to my prior invention, now U.S. Pat. No. 4,170,983, is the requirement of a large number of mold elements for mass production. Accordingly, my new invention disclosed below utilizes the same advantages of ceramic materials, with further production capability using an extrusion process to form a main body member of the solar collector of the desirable ceramic material or the like.

It is noted that U.S. Pat. No. 4,114,597 teaches the use of an extrusion process for a thermal setting material. Unfortunately, such material does not have the thermal conductive properties of ceramic material nor the reliability, and ruggedness that has withstood the test of time. In addition, the use of ceramic material in an extrusion process provides a unique method whereby a substantially integral or one-piece collector may be formed by an extrusion process and then interconnected with similarly formed ceramic collectors having a large surface area.

Indeed, state-of-the-art solar collectors are typically required to be mounted upon a roof or other solid support base in order to support the individual collector elements thereon. Consequently, there exists a need for a solar collector of such strength and durability that the solar collector itself may be supported by roof joists or the like to constitute the roof of a structure.

Therefore, it is an object of this invention to provide an apparatus and method which overcomes the aforementioned inadequacies of the prior art apparatuses and methods and provides an improvement which is a significant contribution to the advancement of the solar collector art.

Another object of this invention is to provide an apparatus and method for extruding a ceramic solar collector in significant lengths having great durability and rigidity and which may be assembled together to constitute the roof of a structure.

Another object of this invention is to provide unique manifolds to interconnect the inputs and outputs of a row of extruded ceramic solar collectors which can be accomplished in the field by relatively inexperienced artisans.

Another object of this invention is to provide connectors for interconnecting, end to end, a series of extruded ceramic solar collectors to produce a solar collector having a length several times longer than the extruded length and which may then be connected to adjacent serially connected extruded ceramic solar collectors by use of the manifolds.

Another object of this invention is to provide a solar collector comprising a transparent material, such as glass, mounted upon a support material, such as closed-cell foam glass, affixed to the surface of the interconnected, extruded ceramic solar collectors to create a "greenhouse" effect thereby increasing the efficiency of the solar collector.

Another object of this invention is to provide a method and an apparatus for manufacturing an economical extruded ceramic solar collector using readily available ceramic materials such that the resultant solar collector may be manufactured throughout the world.

The foregoing has outlined some of the more pertinent objects of the invention. These objects should be construed to be merely illustrative of some of the more prominent features and applications of the intended invention. Many other benefical results can be attained by applying the disclosed invention in a different manner or modifying the invention within the scope of the disclosure contained herein and in the above identified patents, the disclosure of which is hereby incorporated by reference herein. Accordingly, other objects and a fuller understanding of the invention may be had by referring to the summary of the invention and the detailed description of the preferred embodiment in addition to the scope of the invention defined by the claims taken in conjuction with the accompanying drawings.

SUMMARY OF THE INVENTION

The invention is defined by the appended claims with a specific embodiment shown in the attached drawings. For the purpose of summarizing the invention, the invention comprises a solar collector apparatus and method comprising a body member having a plurality of longitudinally extending orifices along the entire length of the solar collector between opposing ends of the body member. More particularly, the body member of the extruded ceramic solar material may be extruded from an extrusion press into which is forced a supply of ceramic material. This process operates continuously to produce an integrally formed body member. Depending upon the selected length of the solar collector, the continuously extruded body member may be sliced at appropriate increments defining such a length. Further, the diameter and number of longitudinally extending orifices may be selected as desired to produce an extruded solar collector of a particular width and with orifices having particular surface area exposed to a fluid flowing therethrough.

The invention further comprises a unique connector for interconnecting, end-to-end, a series of extruded ceramic solar collectors. More particularly, the connector of the invention comprises a ribbon of base material having a plurality of apertures therethrough to correspond to the number and distance apart of the longitudinally extending orifices of the solar collector. A plurality of nipples extend from both sides of the ribbon of base material and are positioned concentrically about the apertures in alignment with the corresponding longitudinally extending orifices of the solar collector. The ends of the nipples are appropriately dimensioned to fit into the corresponding orifices of the solar collector and be sealed therewith by means of an adhesive such as silicone. The outer circumferential surface of the nipples includes annular grooves which force the adhesive into the respective orifices thereby assuring adequate seal therebetween. Finally, the ribbon of base material and the respective nipples may be integrally formed from a material such as 60–70 Durometer EPDM material or the like by injection molding.

The invention still further comprises a unique manifold system for interconnecting the inputs or outputs of a plurality of extruded ceramic solar collectors positioned side by side with one another. More particularly, each unique manifold of the invention comprises a conduit member having a male connector at one end and a female connector at the other. The manifold approximates the width of the solar collector such that one is needed for each solar collector positioned side by side. The conduit member includes a plurality of outwardly extending nipples corresponding to the number and size of the longitudinally extending orifices of the solar collector. These manifold nipples comprise a design similar to that of the connector nipples and, thus, extend into the respective orifices and form a seal therewith by means of an adhesive. The walls of the conduit member and the nipples may be reinforced with a wire mesh thereby preventing undue expansion of the conduit and nipples upon being pressurized with a fluid such as water. Further, slip rings are provided to allow easy interconnection of the conduit member with the conduit member of an adjacent solar collector. Indeed, it is contemplated that a manifold would be factory assembled with one segment of the extruded solar collector and then simply connected end to end with adjacent manifolds through the use of the slip rings as the solar collectors are positioned side by side.

After all of the solar collectors are interconnected end to end through the use of the connectors and are positioned side by side with the respective manifolds interconnected, the entire surface area of the combined solar collectors may be fitted with a transparent material such as glass positioned above the surface of the collectors by means of a cross-hatch of closed-cell glass foam affixed to the surface by means of an adhesive such as silicone. Indeed, the positioning of the sheets of glass above the surface of the solar collectors reduces the heat loss of the collector due to circulating air over the collector.

Finally, due to the inherent rigidity and strength of the extruded ceramic solar collectors of the invention as described above, such solar collectors may be assembled together of form a water-tight roof of a structure such as a pavilion, carport, or the like. Specifically, the extruded ceramic solar collectors may be suspended at opposing ends by roof joists angled in such a manner that the surface of the solar collectors are angled relative to the movement of the sun to achieve optimum efficiency throughtout the winter months. A plurality of rows of such solar collectors could be so supported by respective joists such that a large roof assembly could be manufactured.

The foregoing has outlined rather broadly the more pertinent and important features of the present invention in order that the detailed description of the invention that follows may be better understood so that the present contribution to the art can be more fully appreciated. Additional features of the invention will be described hereinafter which form the subject of the claims of the invention. It should be appreciated by those skilled in the art that the conception and the specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a fuller understanding of the nature and objects of the invention, reference should be had to the following detailed description taken in connection with the accompanying drawings in which:

FIG. 1 is a plan view of a plurality of solar collectors of the invention interconnected end to end by means of a connector and side by side means of a manifold;

FIG. 2 is a partial cross-sectional view of FIG. 1 along the midsection of the solar collectors illustrating the longitudinal cross-section of the solar collectors, the connectors, and the manifolds;

FIG. 2A is an enlarged view, partially in section, of connector illustrating the annular grooves formed on the outside surface of a nipple of the connector which forces the adhesive into the orifice of the solar collector and illustrating the nipple to be sealed therewith partially inserted within the orifice;

FIG. 2B is a partial perspective view of the expandable wire cage formed internally with the nipples of the manifold;

FIG. 3 is an enlarged cross-sectional view of FIG. 1 along the longitudinal length of the manifolds showing the cross-sectional configuration of the manifolds and the manner in which the manifolds are serially interconnected with one another;

FIG. 4 is a cross-sectional view of FIG. 1 along lines 4—4 illustrating the manner in which the sheets of glass are positioned above the surface of the collectors by means of the closed-cell glass foam;

FIG. 5 is a partial cross-sectional view of the manifold fitted to a collector illustrating the manner in which a piece of arcuate metal may be formed about the manifold to shield the manifold from ultraviolet radiation from the sun while assuring that debris, such as leaves, impinging upon the solar collector blows off of the solar collector; and FIG. 6 is a perspective view of a roof structure composed of a plurality of angled rows of collectors of the invention positioned side by side.

Similar reference characters refer to similar parts throughout the several views of the drawings.

DETAILED DESCRIPTION OF THE PREFERRED EMBODIMENT

Referring to FIGS. 1 and 2, the solar collector system 10 of the invention comprises a plurality of extruded ceramic solar collectors 12 connected end to end by means of connectors 14. A plurality of serially connected solar collectors 12 are then positioned in a side by side relationship with each other and fluidly connected together by means of interconnected manifolds 16. A plurality of sheets of transparent material 18 is positioned above the surface of the solar collectors 12 by means of a cross-hatched network of closed-cell glass foam 20.

More particularly, the extruded solar collectors 12 are manufactured by an extrusion process in which a supply of ceramic material is forced through an extrusion die to continuously produce a continuous length of extruded material having a plurality of equally spaced longitudinally extending orifices 22. The extruded material is supported by a conveyor means (not shown) as it is extruded from the die and is then sliced at desired lengths. The desired lengths of the solar collector 12 are then fired to fully cure the ceramic material to optimum density. It is noted that a heat absorbing color, such as black, may be glazed onto the surface of the solar collector 12 prior to firing to increase the heat absorbing characteristics of the solar collector 12. It is also noted that the openings of the longitudinally extending orifices 22 may be reamed to a slightly taped configuration to facilitate interconnection with the connectors 14 and manifolds 16.

As shown in FIGS. 2 and 2A, the connectors 14 function to interconnect the respective longitudinally extending orifices 22 of solar collectors 12 positioned end to end. More particularly, each of the connectors 14 comprises a ribbon of body material 24 having a length approximating the width of the solar collector 12 and a height approximating the thickness of the solar collector 12. A plurality of apertures 26 are positioned through the ribbon of body material in an equally spaced-apart position relative to one another to correspond to the equal spacing of the longitudinally extending orifices 22. A plurality of connector nipples 28 are affixed about the apertures 26 on opposing sides of the ribbon of body material 24. Each of the nipples 28 is dimensioned to engage into the corresponding orifice 22 and form a seal therewith by means of an adhesive 30. Each of the nipples 28 includes a longitudinal hole 32 along its entire length such that a fluid communication path is established between corresponding orifices 22 of the interconnected solar collectors 12.

As shown in FIG. 2A, each of the nipples 28 includes a plurality of annular grooves 34 formed integrally with the nipple 28. Each of the grooves 34 are angularly disposed about the circumference of the nipple 28 toward the tip 36 of the nipple 28. Further, the edge 23 of the orifices 22 are chamfered (preferably 3/16 of an inch) to allow the grooves 34 to be inserted therein. With such configurations, it should be appreciated that with adhesive 30 applied to the grooves 34, the tilted grooves 34 function to force the adhesive 30 into the respective orifices 22 while being slightly compressed. Consequently, an adequate amount of adhesive 30 is forced into the orifice 22 to assure an adequate seal with the respective nipples 28. Finally, it is noted that the ribbon of body material 24, the nipples 28, and their grooves 34 may be integrally formed through the use of injection molding techniques. Preferably, the connector 14 is manufactured from a 60 to 70 Durometer EPDM or similar material capable of providing an adequate bond with silicone adhesive 30 to the ceramic orifices 22.

Referring to FIGS. 2 and 3, each manifold 16 of the solar collector system 10 of the invention comprises a conduit member 38 having a generally circular cross-sectional configuration. A male connector, generally indicated by the numeral 40, is integrally formed at one end and a female connector, generally indicated by numeral 42, is integrally formed at the other end of the conduit member 38. The male connector 40 includes a diameter approximately equal to the diameter of the conduit member 38. A plurality of annular grooves 44 are integrally formed within the outer circumference of the male connector 40. The female connector 42 comprises an increased diameter greater than that of the male connector 40 and conduit member 38 such that the male connector 40 may be fitted therein. Further, the length of the male connector 40 is approximately equal to the inner length of the female connector 42 such that the male connector 40 may be fully fitted into the female connector 42.

The manifold 16 further comprises a plurality of nipples 46 radially extending from the wall of the conduit member 38 along the longitudinal length thereof. Each of the nipples 46 comprises a base portion 48 integrally formed with the wall of the conduit member 38 and a grooved portion 50. (see FIGS. 2B and 5) Both portions 48 and 50 include a hole 52 extending longitudinally along the length of the nipple 46 into the interior of the conduit member 38. The nipples 46 are equally spaced-apart from one another such that the grooved portions 50 correspond and fit into the respective longitudinally extending orifices 22 of the solar collector 12. The grooved portion 50 of the nipples 46 comprises a plurality of grooves 54 similar in configuration to the grooves 34 of the nipples 28 of the connectors 14, as illustrated in FIG. 2A, to force adhesive 47 into the respective orifices 22 during assembly.

As noted earlier, the male connector 40 and female connector 42 of adjacent solar connectors 12 are designed to serially engage one another to serially interconnect manifolds 16 of adjacent solar collectors 12; to the uniform spacing of the longitudinally extending orifices 22 of each of the solar collectos 12; it is noted that it is necessary to form a slot 56 and 58 in the male and female connectors 40 and 42, respectively, such that the respective connectors 40 and 42 may fully engage into one another without engaging or overlapping the leading and trailing-most nipples 46 of the adjacent manifolds 16. Each such slots 56 and 58 may comprise a blind slot having a rounded bottom approximately the diameter of the longitudinal hole 52 and the base portion 48 of the nipples 46, respectively.

The above described manifold 16 of the invention may be composed of a large variety of presently available materials from plastics to rubber materials. The entire structure of the manifold 16 may be economically produced by known injection molding techniques. However, it is noted that when the manifold 16 is composed of a relatively resilient material, such as rubber, excessive and undesirable stretching of the rubber may occur along the length of the manifold 16 and the base portion 48 of the nipples 46. In order to reduce such undesirable stretching, the manifold 16 may further comprise a wire cage 60 or other reinforcement means imbedded within the walls of the manifold 16 during the injection molding process. More particularly, cage 60 may comprise generally circular rings 60R positioned in a spaced-apart manner by a plurality of longitudinal wires 60L running the length of the manifold 16 from connector to connector 40 and 42. The rings and longitudinal wires 60R and 60L are welded together at their contact points to provide a rigidly sound structure imbedded within the material constituting the manifold 16.

In a similar fashion, the nipples 46 of the manifold 16 may be reinforced with imbedded wires 62. Specifically, referring to FIG. 2B, the nipples 46 may be reinforced by similarly disposed circular rings 62R and longitudinal wires 62L welded together within the base portion 48 of the nipples 46 which are, in turn, welded to the circular rings 60R and longitudinal wires 60L of the conduit member 38. However, only the longitudinal wires 62L, and not the circular rings 62R, extend into the groove portion 50 of the nipples 46. This assures that the walls of the grooved portion 50 of the nipples 46 can expand outwardly against the lumen of the orifice 22 of the solar collector 12 to increase the bond therewith, particularly when the system 10 is pressurized with water or other fluid. Further, it is noted that outward expansion of the grooved portion 50 within orifice 22 may be further enhanced by welding an accordion shaped wire 62A, composed of spring steel, to the terminal ends of the longitudinal wires 62L within the grooved portion 50. Such a configuration may be sufficiently compressed to allow the nipples 46 to engage into the respective orifices 22 but, once in place, exert an outward force against the lumen of the orifice 22 during the curing of the adhesive 47.

During mass production, it is contemplated that the connectors 14 and/or the manifolds 16 would be installed to the respective solar collectors 12 for later transport to the site of installation. On the site, another solar collector 12 without a connector 14 fitted therein, can be quickly and easily fitted to the factory installed connector 14 through the use of adhesive 30. Similarly, another solar collector 12 having a manifold 16 installed thereon, can be quickly and easily fitted to the manifold 16 of an adjacent solar collector 12 through the use of adhesive 47. In this regard, it is noted that added bonding of the male and female connectors 40 and 42, respectively, may be accomplished through the use of a circular clamp or ring 64 positioned about the female connector 42.

Referring to FIG. 4, the interconnected solar collectors 12 are insulated on their undersides by a sheet of closed-cell glass foam 100 affixed to the underside of the solar collectors 12 by means of silicone adhesive 102 or the like. Further, silicone adhesive 102 is injected into the areas between adjacent solar collectors 12 to function as expansion joints while sealing the adjacent solar collectors 12 together. A plurality of closed-cell glass foam strips 104 are adhered to the upper surface of the solar collectors 12 by means of similar silicone adhesive 102. Preferably, the closed-cell glass foam strips 104 are positioned in a cross-hatch pattern coinciding with the joints between adjacent solar collectors 12. One or more sheets of transparent material 106, such as glass, is then adhered to the upper surface of the closed-cell glass foam strips 104 by similar silicone adhesive 102 or the like. As a result, the glass sheets 106 are spaced-apart from the upper surface of the solar collectors 12 thereby defining a plurality of air spaces 108 therebetween. Air spaces 108 isolate the upper surface of the solar collector 12 from air currents thereby reducing heat loss. Further, the blackened glazed surface of the solar collectors 12 significantly increases the solar efficiency of the system 10.

As shown in FIG. 5, an arcuate sheet of aluminum or steel 112 may be positioned over the manifolds 16 to protect the manifolds 16 from contamination due to debris such as leaves. Indeed, the arcuate sheet 112 may extend into a conventional gutter 114 as shown in FIG. 5. The arcuate sheet 112 is preferably secured into position over the manifold 16 by engaging its edge underneath the lip of the glass sheet 106 and then securing the same into place by means of silicone adhesive 102. Finally, it is noted that the manifold 16 may be insulated from the environment by positioning conventional pipe insulation 116 thereabout along its length.

From the foregoing, it should be appreciated that the solar collector system 10 of the invention can be mounted on virtually any surface in both domestic and commercial applications. Further, it should be appreciated that a large number of solar collectors 12 may be serially connected end to end and adjacent to one another by means of the connectors 14 and the manifolds 16 to constitute a relatively large surface area exposed to the sun. When serially connected, a set of manifolds 16 can function as the input of the solar collector system 10 with the other set of serially connected manifolds 16 functioning as the output. The input and output may be connected in closed loop cycle with an appropriate fluid pump and heat storage facility, such as a tank and be cycled on and off, depending upon the availability of heat in the collectors 12. Further, the collectors 12 may be equipped with suitable drain-down systems to drain the collectors 12 of water in the event of freezing conditions.

Notwithstanding the versatility in utilizing the solar collector system 10 of the invention, the system 10 is uniquely adaptable to constitute the roof of a structure such as a pavilion, carport, or the like. More particularly, referring to FIG. 6, a roof structure, generally indicated by the numeral 200, may be composed of a plurality of solar collectors 12 connected end to end by means of connector 14 and connected side by side by a series of interconnected manifolds 16 functioning as the input to the collectors 12 and by another series of interconnected manifolds 16 at the other end functioning as the output. Each row of end to end collectors 12 positioned side by side may be supported by a framework, generally indicated by numeral 202, such that the row of solar collectors 12 are tilted to an advantageous angle relative to the path of the sun as is customary in the trade. Further, the row of collectors 12 may have one corner 204 positioned higher than the other corner 206 of the upper edge such that the entire set of solar collectors 12 can be drained of the heat transfer fluid (water) by conventional drain-down systems in the event of freezing conditions.

It should be appreciated that the number of solar collectors 12, positioned side by side in the row, is almost limitless and, hence, a solar collector system 10 may be assembled with an extremely large surface area exposed to the sun. Moreover, as illustrated in FIG. 6, a plurality of rows of solar collectors 12 can be supported by respective frameworks 202 and interconnected with adjacent rows of collectors 12 by interconnecting input and output conduits 208 and 210, respectively, connected to each set 16I of input manifolds and each set 16O of output manifolds. This parallel relationship of the rows of solar collectors 12 can also be virtually unlimited to increase the total collector area exposed to the sun. However, in order to accomplish draining of each of the collectors 12, the conduits 208 and 210 must be appropriately angled and connected to the sets 16I and 16O of the manifolds 16 with intermediate conduits 212.

Since the extruded ceramic solar collectors 12 are extremely strong and durable, the actual construction of the framework 202 is greatly simplified as it need only support the ends of the collectors 12. Indeed, framework 202 may simply comprise upper and lower joists 214 and 216, respectively, extending the length of the row of collectors 12 and supported by upstanding members 218 and base members 220. The entire framework 202 and the solar collector system 10 supported thereby may then be elevated by upstanding posts 222. Further, a sheet of transparent or translucent material 224 may be sealingly affixed to the upper and lower ends of each row of the solar collectors 12 to form a water-tight roof structure 200. Thus, the roof structure 20 supported in an elevated position uniquely functions as a pavilion, carport, open garage or the like. Consequently, the solar collector system 10 of the invention may be constructed over existing parking facilities to supply solar energy to the commercial application and covered parking for the commercial installation's employees.

The present disclosure includes that contained in the appended claims, as well as that of the foregoing description. Although this invention has been described in its preferred form with a certain degree of particularity, it is understood that the present disclosure of the preferred form has been made only by way of example and that numerous changes in the details of construction and the combination and arrangement of parts may be resorted to without departing from the spirit of the invention.

Now that the invention has been described, what is claimed is:

1. A solar collector system, comprising in combination:

an extruded solar collector composed of a ceramic material produced by an extrusion process and composed of a vitrified ceramic material with a plurality of orifices longitudinally extending therethrough;

an input manifold having a plurality of nipples corresponding to the plurality of orifices;

an output manifold having a plurality of nipples corresponding to the plurality of orifices;

means for positioning said nipples of said input manifold into one end of the plurality of orifices and for positioning said nipples of said output manifold into the other end of the plurality of orifices such that a fluid flowing into said input manifold flows through said nipples of said input manifold into the plurality of orifices and then through said nipples of said output manifold into said output manifold;

a sheet of transparent material affixed in a spaced-apart position above said solar collector by means of a stand-off material;

said stand-off material comprises strips of insulated material adhered to said solar collector and said sheet of transparent material;

said strips of material comprise closed cell glass foam;

an insulated material positioned about said manifolds; and an arcuate member adhered between said sheet of transparent material and said strip of material and positioned over one of said manifolds to prevent debris from being deposited between said manifold and said solar collector 2. The solar collector system as set forth in claim 1, wherein each said manifolds comprises a conduit member having a male connector at one end and a female connector at the other end with said nipples extending radially from said conduit member such that a row of collectors may be positioned side by side with the respective said input manifolds and said output manifolds thereof serially interconnected with one another.

3. The solar collector system as set forth in claim 2, further comprising an input to said series of interconnected said input manifolds positioned at one corner of the side by side solar collectors and an output positioned in said series of interconnected said output manifolds at a diagonally opposing corner of the side by side collectors.

4. The solar collector system as set forth in claim 2, further comprising a framework for supporting said side by side solar collectors in an angled position relative to the path of the sun, said framework comprising a pair of upper and lower joists supporting the upper and lower ends of the side by side solar collectors.

5. The solar collector system as set forth in claim 4, further comprising a plurality of rows of side by side solar collectors, each supported by said framework and having said input of said input manifolds fluidly connected together by an input intermediate conduit and said output manifolds being fluidly connected together by an output intermediate conduit.

6. The solar collector system as set forth in claim 5, wherein said intermediate conduits are angularly positioned to provide for draining of the solar collectors.

7. The solar collector system as set forth in claim 1, further comprising a sheet of insulated material affixed to the underside of the solar collector.

8. The solar system as set forth in claim 1, further comprising an adhesive positioned in a joint between side by side said solar collectors to provide a watertight expansion joint.

9. The solar collector system as set forth in claim 1, further comprising a sheet of material sealingly positioned between angled rows of the side by said solar collectors to form a roof structure.

10. The solar collector system as set forth in claim 9, wherein said sheet of material is translucent.

* * * * *